(No Model.)

G. W. BALLARD.
SEEDING MACHINE.

No. 281,331. Patented July 17, 1883.

WITNESSES:
Fred. G. Dieterich

INVENTOR.
George W. Ballard
By Louis Bagger & Co.
ATTORNEYS.

N. PETERS. Photo-Lithographer, Washington, D. C.

UNITED STATES PATENT OFFICE.

GEORGE W. BALLARD, OF HUNTER'S SPRINGS, WEST VIRGINIA.

SEEDING-MACHINE.

SPECIFICATION forming part of Letters Patent No. 281,331, dated July 17, 1883.

Application filed March 3, 1883. (No model.)

*To all whom it may concern:*

Be it known that I, GEORGE W. BALLARD, of Hunter's Springs, in the county of Monroe and State of West Virginia, have invented certain new and useful Improvements in Seeding-Machines; and I do hereby declare that the following is a full, clear, and exact description of the invention, which will enable others skilled in the art to which it appertains to make and use the same, reference being had to the accompanying drawings, which form a part of this specification, and in which—

Figure 1:
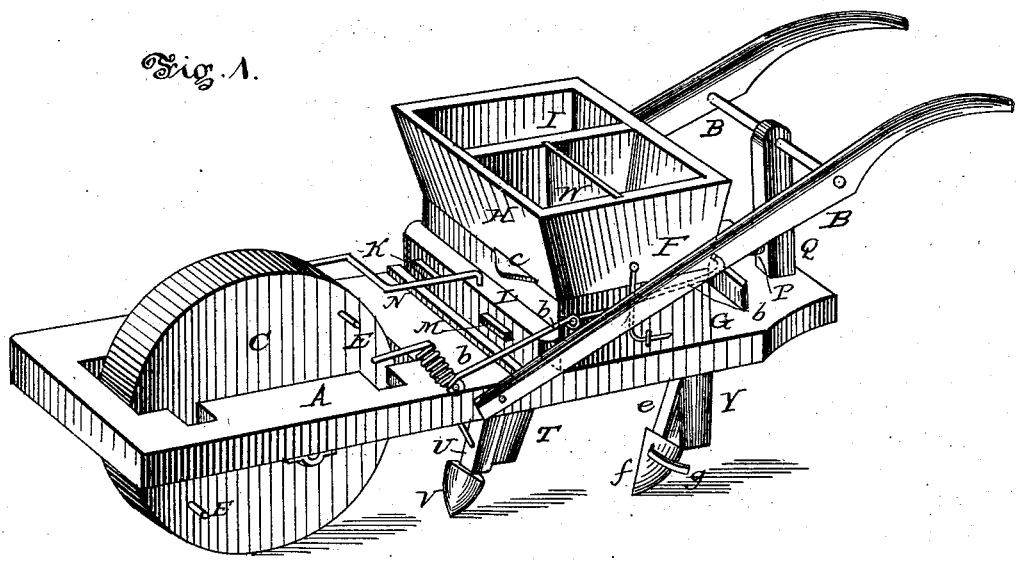
Figure 2:
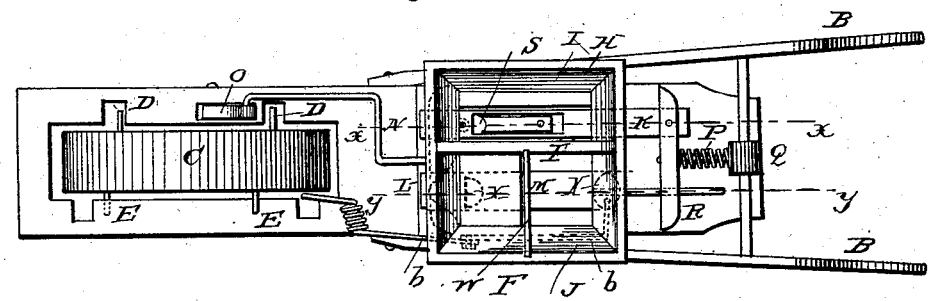
Figure 3:
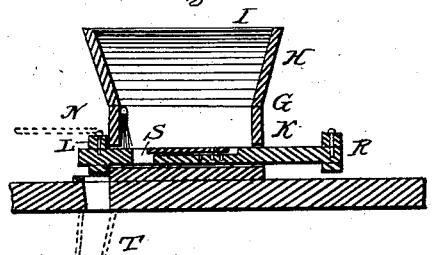
Figure 4:
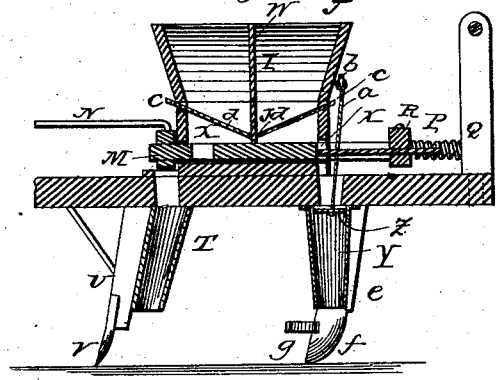

Figure 1 is a perspective view of my improved corn planter and fertilizer. Fig. 2 is a top view of the same. Fig. 3 is a longitudinal vertical section on line $x\ x$, Fig. 2; and Fig. 4 is a similar view on line $y\ y$, Fig. 2.

Similar letters of reference indicate corresponding parts in all the figures.

My invention has relation to corn planters and fertilizers; and it consists in the improved construction and combination of parts of a planter adapted to deposit a certain amount of fertilizer into every hill, and thereupon deposit another amount of fertilizer on top of the hill after the seed has been covered, as hereinafter more fully described and claimed.

In the accompanying drawings, the letter A indicates the frame of the planter, to the front end of which the draft is applied, and provided with two rearward-extending handles, B. The drive-wheel C is journaled in the front end of this frame, and has upon its faces four laterally-projecting pins, D D and E E, two on each side, diametrically opposite each other, which operate the seed and fertilizer dropping mechanisms. Upon the rear portion of the frame is fastened the seed-box F, consisting of a rectangular box, G, and a removable hopper, H, each having a longitudinal partition, I and J, one above the other, separating the seed and fertilizer compartments.

The seed-slide K slides in the seed-compartment of box G, passing through both ends of the box, and fastened at its forward end to a yoke, L, to which the fertilizer-slide M is fastened, which slides in the same manner in the fertilizer-compartment; and a bar, N, is hinged to the said yoke and to a short arm, O, which is hinged at its lower end to the frame at one side of the wheel, the pins D engaging the arm while rotating with the wheel and drawing it forward until they slip over its upper end, whereupon the arm, bar, and seed-slide are drawn back by a spring, P, which is fastened at its rear end to an upright, Q, upon the rear end of the frame, while its forward end is fastened to a yoke, R, to which the rear ends of the seed and fertilizer slides are fastened. The seed-slide is provided with a perforation or seed-cup, S, which empties its contents into the seed-chute T, fastened to the rear side of a standard, U, upon the lower end of which is a shovel or blade, V, which opens the ground for the reception of the seed and fertilizer.

A removable transverse partition, W, divides the fertilizer-compartment into two sub-compartments, and the fertilizer-slide has two perforations or cups, X, one at each end, which discharge their contents as the slides are moved forward and drawn back, the forward cup into the seed-chute, dropping the seed and fertilizer at the same time, and the rear cup into a fertilizer-chute, Y, fastened to the frame to the rear of the seed-box, having a valve, Z, which is operated by a cord or chain, $a$, fastened to the valve and to the rear end of a lever, $b$, pivoted upon the side of the seed-box, and having its forward end bent inward and forward in such a manner that it may be lifted by the pins E upon the face of the drive-wheel. These pins are placed at such a distance from the seed-slide-operating pins that they will lift the lever, opening the valve in the moment the fertilizer-chute passes over the place where the seed and fertilizer were dropped, thus placing the fertilizer upon the surface over the hill. The transverse partition in the fertilizer-box is for the purpose of placing two kinds of fertilizer in the box—one to be dropped into the ground with the seed, and another for surface fertilizing; and it may be removed when only one kind is to be used, while two oblique slides, $c$, sliding in grooves $d$ in the side of the seed-box, and the longitudinal partition, serve to close off either of the sub-compartments from their cups.

Valve Z is preferably a simple clap-valve, hinged to the under side of the frame in the fertilizer-chute, covering the hole through which the fertilizer passes down into the chute, and opens downward when the forward end of the lever is raised by its own weight and that of the fertilizer upon it.

By the side of the fertilizer-chute is the standard e, upon the lower end of which the covering-shovel f is fastened, having an adjustable laterally-extending covering-wing, g, so that the seed is covered immediately before the surface fertilizer is dropped.

Having thus described my invention, I claim and desire to secure by Letters Patent—

1. In a corn planter and fertilizer, the combination of the seed and fertilizer box, divided longitudinally into the seed and the fertilizer compartments, the latter having the transverse partition and oblique shut-off slides, the seed and fertilizer slides, connected by yokes at both ends, and having means for reciprocating them, the latter having two cups, one at each end, a forward seed and fertilizer chute, and a rear fertilizer-chute having a clap-valve and means for operating it, as and for the purpose shown and set forth.

2. In a corn planter and fertilizer, the combination of the seed-box F, having longitudinal partition I J, transverse partition W, and oblique cut-off slides c, seed and fertilizer slides K and M, having cups S and X X, and connected by yokes L and R, spring P, bar N, and arm O, drive-wheel C, having pins D and E, fertilizer-chute Y, having hinged valve Z, and lever b, having chain or cord a, as and for the purpose shown and set forth.

In testimony that I claim the foregoing as my own I have hereunto affixed my signature in presence of two witnesses.

GEORGE WASHINGTON BALLARD.

Witnesses:
ROBERT JESSEE CUMMINGS,
HENRY W. WIKEL.